J. D. TEW.
TIRE VULCANIZING APPARATUS.
APPLICATION FILED AUG. 9, 1913.
1,137,097.
Patented Apr. 27, 1915.
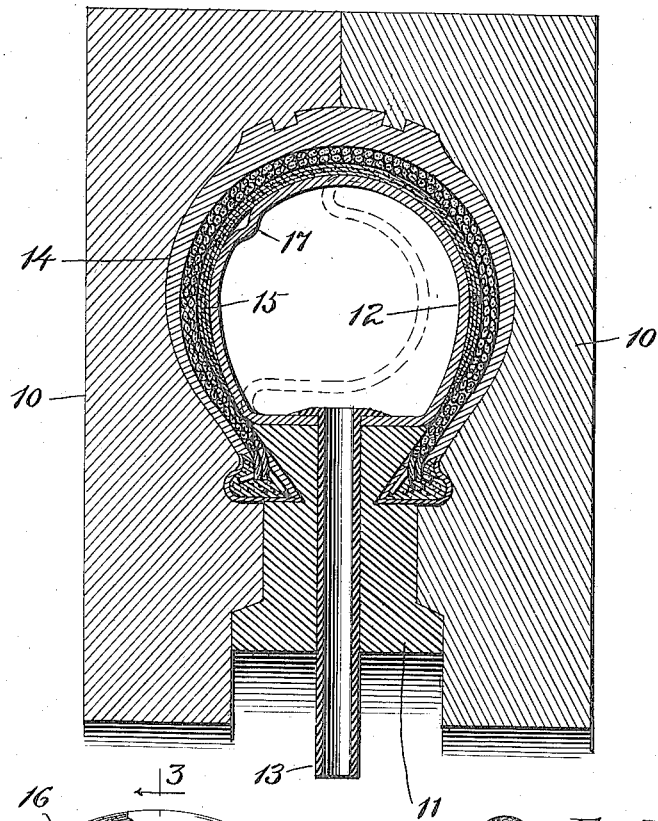
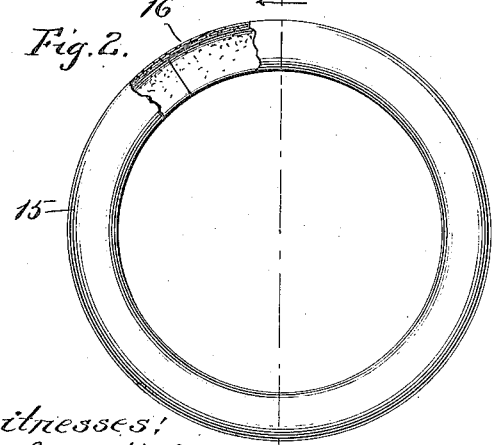
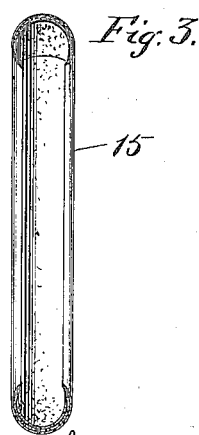

UNITED STATES PATENT OFFICE.

JAMES D. TEW, OF AKRON, OHIO, ASSIGNOR TO THE B. F. GOODRICH COMPANY, OF NEW YORK, N. Y., A CORPORATION OF NEW YORK.

TIRE-VULCANIZING APPARATUS.

1,137,097.  Specification of Letters Patent.  Patented Apr. 27, 1915.

Application filed August 9, 1913. Serial No. 783,927.

*To all whom it may concern:*

Be it known that I, JAMES D. TEW, a citizen of the United States, residing at Akron, in the county of Summit and State of Ohio, have invented certain new and useful Improvements in Tire-Vulcanizing Apparatus, of which the following is a specification.

In vulcanizing pneumatic tire casings it is often necessary or desirable to employ a tubular air or water bag which furnishes an outward pressure within the casing for the purpose of compacting, stretching or holding the shape of the casing during vulcanization, and with certain types in particular, such as cord tires, the casing is originally smaller than the outer mold, and has considerable permanent stretch imparted to it by the inflatable bag. The bags have to be collapsed (as by means of a vacuum pump) in order to get them into the casings, and after being used one or more times, they become rather stiff, and although still collapsible, they fail to contract to their original cross-section, the consequence being that a wrinkle is formed in the bag, which seldom is completely effaced by the distention of the bag, and this wrinkle causes a corresponding ridge to appear on the inner surface of the vulcanized casing.

The object of my invention is to substantially prevent the formation of such ridges, and this I accomplish by interposing a pressure-transmitting shield between the pressure bag or tube and the tire casing, the said shield being made of material which is sufficiently stiff to avoid conforming to the wrinkles or other small irregularities in the tube.

Of the accompanying drawings, Figure 1 represents a cross-section showing a vulcanizing mold, tire-casing, tubular bag and a shield constructed according to my invention, assembled in their operative relation. Fig. 2 represents a side elevation of the shield, partly in section. Fig. 3 represents a cross-section of the shield.

In the drawings, 10, 10 are the two halves of a clencher tire mold, and 11 is an annular mold section or ring which coöperates with said sections 10 in molding the inner edges or beads, and which also forms a seat for the bag 12, the latter having a tubular stem 13 projecting through a hole in the ring 11 for connection with a source of fluid pressure or vacuum, these parts being of familiar construction.

In the mold is shown a tire-casing 14 of a well-known cord type, and between said casing and the mold I have shown my improved shield 15. The latter may conveniently be made out of several plies of rubberized fabric, shaped to conform to the inner contour of the tire and preferably having its inner edges beveled. The ends of the shield are also preferably beveled, and are adapted to overlap as indicated at 16 when the shield is first placed in the tire.

In operating with this apparatus, the shield 15 is contracted circumferentially and placed in the tire-casing 14, with its ends overlapping as described, the tubular bag 12 is collapsed by exhausting the air from it with a vacuum pump, and is placed in the casing, the vacuum causing the side wall of the bag to assume the dotted-line position shown in Fig. 1. The ring 11 (which is in two or more sections) is put in place and the mold parts assembled and bolted together in the usual way. The tire casing being initially smaller than the outer mold, it is evident that when the bag 12 is inflated by means of hydraulic or other fluid pressure, its side wall, which had previously assumed the dotted-line position, will not at once become fully convex, but will form a wrinkle 17 which gradually becomes smaller as the bag and casing expand, but which usually does not entirely disappear, especially if the bag has been used several times. The presence of the shield 15, however, prevents the formation of a corresponding ridge on the inner surface of the casing when the latter is fully expanded in the mold, as the material of which said shield is composed will be sufficiently stiff to transmit the outward pressure of the bag without conforming to the shallow wrinkle which ordinarily remains after the outer mold has arrested further expansion. At the same time the shield is sufficiently flexible to be inserted in the tire and to take the natural contour imposed by the mold and the bag, its ends being initially overlapped by an amount corresponding to the circumferential expansion which the shield undergoes during the distention of the bag and casing.

The term "outer mold" is intended to include any means used to confine the outside of the tire during vulcanization.

I claim:—

Apparatus for stretching and vulcanizing pneumatic tire casings comprising, in combination with the outer mold and inner inflatable pressure-tube, an annular, relatively-stiff, but flexible, discontinuous, removable shield adapted to be located between the tube and the tire casing, for transmitting the pressure of the tube to the casing without substantially conforming to irregularities in the surface of said tube, said shield being longer than the unexpanded circumference of the pressure tube, so that its ends overlap when placed in the tire and slide on each other as the tire is expanded by inflation of the tube.

In testimony whereof I have hereunto set my hand in the presence of two subscribing witnesses, this sixth day of August, 1913.

JAMES D. TEW.

Witnesses:
L. A. SMITH,
E. F. BAUER.